Aug. 30, 1955     K. BURIAN     2,716,724
ELECTRIC MOTOR

Filed Nov. 27, 1950     3 Sheets-Sheet 1

INVENTOR.
Kurt Burian
BY
Wallenstein + Spangenberg
attys

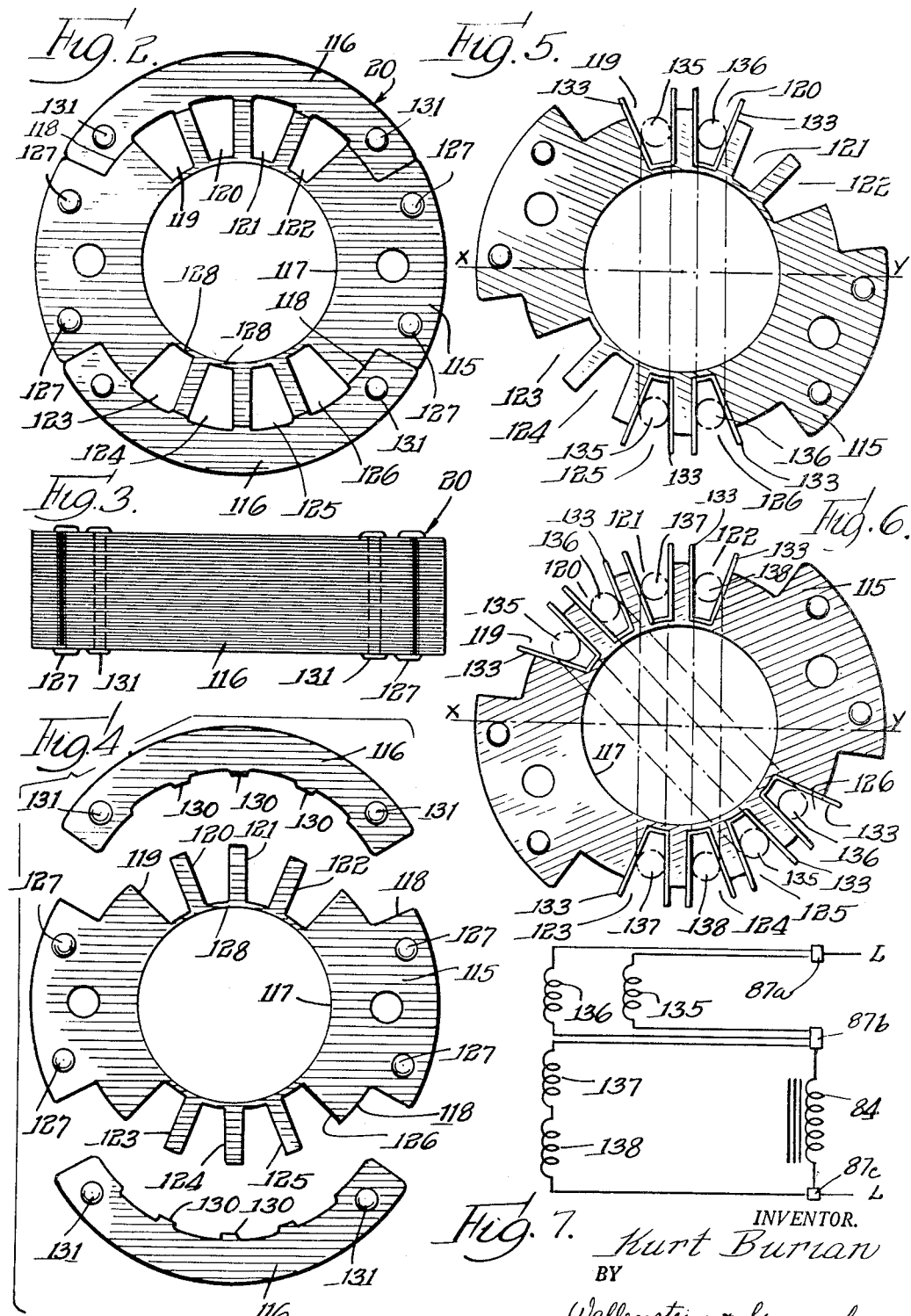

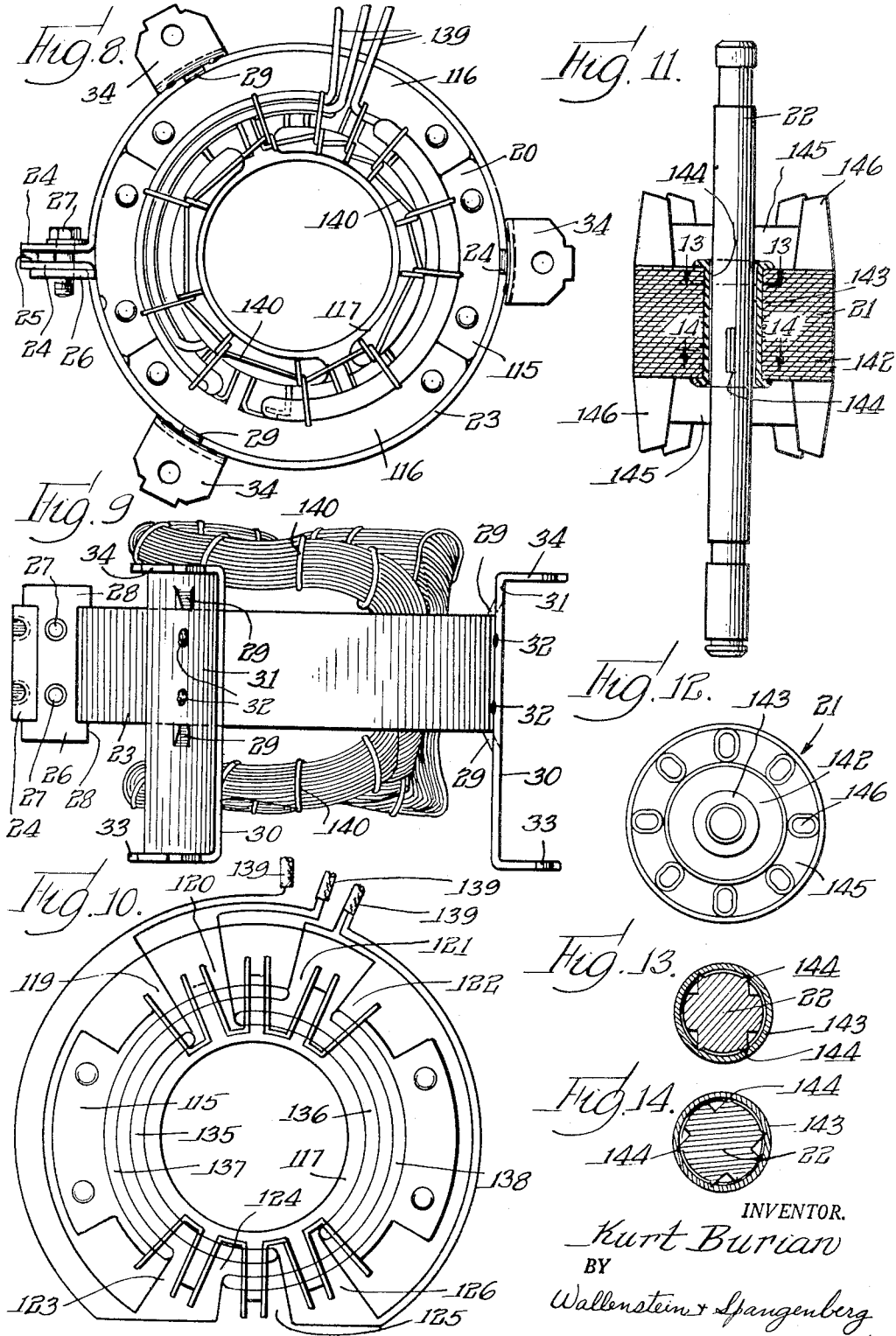

United States Patent Office 2,716,724
Patented Aug. 30, 1955

2,716,724

ELECTRIC MOTOR

Kurt Burian, Chicago, Ill., assignor to G-M Laboratories, Inc., Chicago, Ill., a corporation of Illinois Application November 27, 1950, Serial No. 197,723

14 Claims. (Cl. 318—220)

This invention relates to an electric motor which is of general utility and which is particularly adaptable for use in an improved floor polishing and scrubbing machine having a single rotary flat brush which is driven by the motor.

The principal object of this invention is to provide an improved electric motor of the single phase induction type, which has an improved stator structure, which has an improved winding and circuit arrangement, which may be readily and inexpensively manufactured, which has good starting and running characteristics, which is adaptable for general use, and which has particular utility for use in a floor polishing and scrubbing machine.

A floor polishing and scrubbing machine utilizing the novel motor of this invention is fully illustrated and described in a co-pending application Serial No. 197,725, filed by Archie J. McMaster, William H. Kitto, and Kurt Burian on November 27, 1950. Such a machine includes a base member which is preferably of an inverted cup-shaped configuration. A substantially constant speed single phase induction motor embodying the novel features of this invention is mounted on the upper side of the base member with the motor shaft extending downwardly through the base member. A phasing reactor is also mounted on the upper side of the base member. A cover is secured to the upper side of the base member and encloses the motor and phasing reactor. The lower end of the motor shaft operates a motor pinion meshing with a cluster gear carried by a bracket secured to the lower side of the base member. The cluster gear also meshes with an output gear carried by a bracket also secured to the lower side of the base member. Mounting means detachably secure a flat rotary brush to the output gear to be driven thereby. A centrifugal clutch is located between the motor shaft and the motor pinion. A handle having a bail is pivotally mounted on the side of the frame in transverse alignment with the brush axis for manipulating and controlling the machine.

The driving motor of this invention is of unique construction and provides for great economy in manufacture. It includes a laminated rotor provided with rotor bars and integral cooling fins, the rotor being carried by the motor shaft. It also includes a laminated stator of three parts. One part has a central opening for receiving the rotor and also a plurality of opposed external slots for receiving the motor windings. The motor here illustrated by way of example has four pairs of such external slots. The external slots are provided with suitable slot liners and the coils may be machine wound directly on the stator piece. In this respect the stator piece may be applied to a suitable rotatable winding fixture and rotated about a transverse axis substantially perpendicular to a plane passing through a pair of opposed external slots. In this way the coil may be machine wound in these opposed external slots. The stator piece may then be shifted similarly to wind coils in the other pairs of external slots. If desired, two sets of coils may be simultaneously wound in adjacent pairs of external slots. This procedure eliminates the necessity of separately winding the coils and then inserting them in the slots and also eliminates the necessity of separate lead wires from the stator coils. Further, the stator coils so formed may be readily, rapidly and inexpensively tied. The other two stator pieces are generally crescent-shaped and overlie the external slots of the first stator piece to complete the magnetic circuit outside the windings. The three stator pieces are automatically clamped into position by a clamping band which forms a part of the stator supporting member. The inner closed portions of the stator slots also aid materially in the distribution of the flux and improve the performance of the motor.

The motor stator supporting member includes a bank for clamping the motor stator and is provided with upwardly and downwardly extending legs. The clamping nut may be provided with ears overlying the stator and/or the legs may be lanced to provide lugs overlying the stator to prevent longitudinal shifting of the stator in the supporting member. The downwardly extending legs are secured to the upper side of the base member. The upwardly extending legs carry a bearing support plate. The base member and the bearing support plate are provided with bearing seats for receiving self-aligning bearings for the motor shaft. In assembling the machine the stator supporting member is loosely secured to the base member, the bearing support plate is loosely secured to the stator supporting member, and the rotor is shimmed with respect to the stator for centering the same. The stator supporting member and the bearing support plate are then tightly secured in place and the shims removed. In this way the rotor is accurately centered in the stator and the necessity for maintaining extremely close tolerances for centering purposes is eliminated. This feature greatly reduces the cost of manufacture of the machine and improves its performance. The motor shaft is also provided with improved thrust bearings cooperating with the motor bearings and in addition a fan is carried by the motor shaft in a manner so that the hub of the fan operates as the thrust stop for the upper thrust bearing.

When the machine is used as a scrubber rather than a polisher, the resistance to rotation of the brush is less. However, the brush will not unduly speed up, as in other machines of this general type, because of the substantially constant speed characteristics of the motor. Thus, flinging outwardly of soap and water and consequent splashing of furniture, walls and the like are eliminated.

Further objects of this invention reside in the details of construction of the electric motor of this invention, the cooperative relationship of the component parts thereof and the method of winding the stator windings.

Other objects and advantages of this invention will become apparent to those skilled in the art upon reference to the accompanying specification, claims and drawings, in which:

Fig. 2 is a top plan view of the motor stator;

Fig. 3 is a side elevational view of the motor stator;

Fig. 4 is an exploded view of the laminations forming the stator;

Figs. 5 and 6 are diagrammatic illustrations showing the manner of winding the coils on the stator;

Fig. 7 is a schematic wiring diagram of the motor;

Fig. 8 is a top plan view of the assembled motor stator;

Fig. 9 is a side elevational view of the assembled motor stator;

Fig. 10 is a diagrammatic illustration of the motor stator showing the coil arrangement and the electrical connections thereto;

Fig. 11 is a vertical sectional view through the motor rotor;

Fig. 12 is an end elevational view of the motor rotor; and

Figure 1:
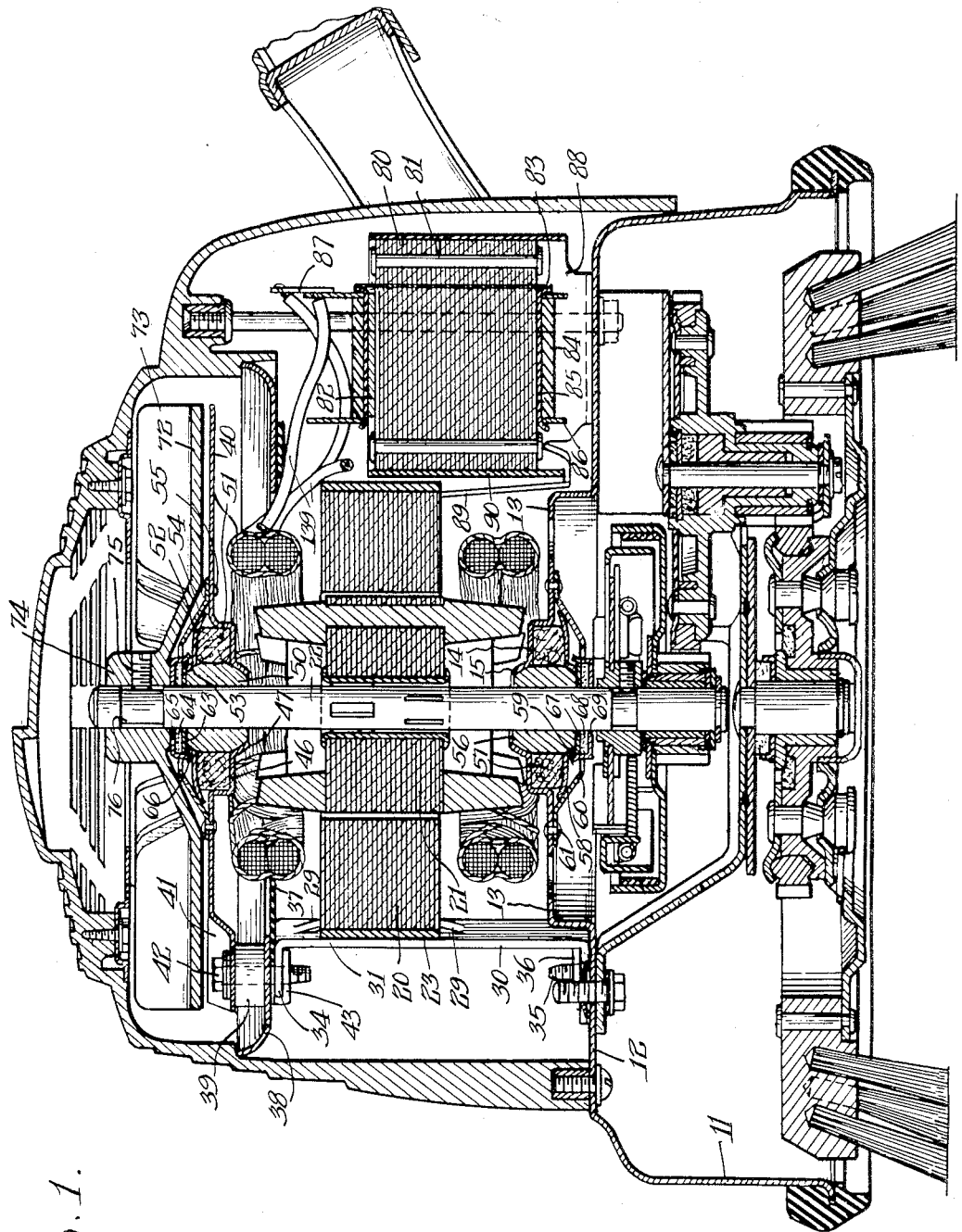
Fig. 1 is an enlarged vertical sectional view taken through a machine utilizing the novel motor of this invention.

Figs. 13 and 14 are partial sectional views taken along the lines 13—13 and 14—14, respectively, of Fig. 11.

Referring first to Fig. 1, the floor polishing and scrubbing machine incorporating the novel motor of this invention includes an inverted cup-shaped base member formed from sheet steel having a side wall 11 and a top wall 12. The top wall 12 is recessed at 13 and is formed with a central bearing seat 14 having a spherical bearing supporting surface 15.

Mounted on the upper side of the base member is the novel electric motor, preferably of the split phase induction type. It includes a stator 20 and a rotor 21 carried by a shaft 22. The stator is carried by a stator support member which is illustrated in more detail in Figs. 1, 8 and 9. The motor support member includes a clamping band 23 for clamping the motor stator. In this respect the clamping band 23 is provided with a pair of ears 24 having suitable holes therethrough, one of the ears being provided with a lug 25. A twin nut member 26 receives screws 27 extending through the holes in the ears 24 for the purpose of clamping the motor stator 20 in place. The nut member 26 is provided with projections 28 which overlie the stator 20 to prevent longitudinal shifting of the stator in the stator support member upon jarring of the machine. The stator support member also includes a plurality of downwardly extending legs 30 and upwardly extending legs 31. These legs may be integrally formed from sheet metal and may be welded to the sheet metal clamping band as at 32. The legs 30 and 31 may also be lanced to provide lugs 29, also overlying the motor stator to prevent longitudinal shifting thereof.

The downwardly extending legs 30 are bent outwardly to provide attaching ears 33 having holes therein for the purpose of securing the motor stator support to the upper side of the base member. Likewise, the upper ends of the upwardly extending legs 31 are bent outwardly to form attaching ears 34 having holes for the purpose of mounting a bearing support plate. The motor stator support is secured to the upper wall 12 of the base member by means of screws 35 extending through the base member and attaching ears 33 and by means of nuts 36. The attaching ears 34 of the upwardly extending legs 31 carry an annular baffle plate 38, spacers 39, and a bearing support plate 40. The bearing support plate 40 is located above the baffle plate 38 and is cupped at 41 for receiving screws 42 extending through the bearing support plate 40, spacers 39, baffle plate 38 and attaching ears 34. The parts are held in assembled relation by nuts 43 cooperating with the screws 42. The baffle plate 38 and bearing support plate 40 are formed from sheet metal. The baffle plate 38 carried inwardly an annular baffle 37 which closely surrounds the windings of the electric motor. In this respect the baffle 37 is made of insulating material so as not to cause shorting of the motor windings. The bearing support plate is provided with a bearing seat 46 having a spherical seating surface 47.

The bearing support plate 40 supports a self-aligning bearing 50 preferably made of sintered porous bronze, the bearing having a spherical surface for engagement with the spherical seat 47 of the bearing plate. The porous bronze bearing 50 is surrounded with an absorbent washer 51 containing oil which feeds through the porous bearing for lubricating the running surfaces between the bearing and the motor shaft. A spring member 52 overlies the absorbent washer 51 and is provided with a spherical bearing seat 53 engaging a spherical surface on the other end of the bearing 50. A conical member 54 secured to the bearing plate 40 by rivets 55 places a spring tension on the spring member 52 for maintaining the bearing 50 in position on the bearing support plate 40.

The motor bearing construction carried by the base member is identical to that carried by the upper bearing support plate. It includes a self-centering sintered porous bronze bearing 56, an absorbent washer 57 containing oil, a spring member 58 provided with a spherical bearing seat 59, and a conical member 60 secured by rivets 61 to the base member tensioning the spring member 58.

In mounting the motor, the stator support member is first loosely secured to the base member and the upper bearing support plate 40 is loosely secured to the stator support member. The rotor is then shimmed in place in the stator for centering the same. During this shimming operation the motor bearings 50 and 56 self center. The stator support member is then securely fastened to the base member and the upper bearing support member is securely fastened to the stator support member. The shims are then removed and the rotor is thereby self-centered in the stator for free rotation therein. In this way the necessity for maintaining extremely close tolerances for centering purposes is eliminated.

To limit longitudinal movement of the rotor, the rotor shaft is provided with upper and lower thrust bearings. The upper thrust bearing includes a metal washer 63 running on the bearing 50. This metal washer is backed by a resilient washer 64 such as cork, the resilient washer 64 being tightly fitted to the motor shaft 22 and enclosed in a cup-shaped member 65 to maintain a friction fit between the resilient washer and the motor shaft. The cup-shaped member 65 is flared outwardly along its edge at 66 to act as a slinger of any oil which tends to pass from the bearing along the shaft, the oil being returned to the absorbent washer 51. The lower thrust bearing is the same as the upper. It includes a metal washer 67 running against the motor bearing 56, a resilient washer 68 and a cup-shaped member 69.

The upper end of the motor shaft carries a fan 72 having fan blades 73. The fan hub 74 receives the motor shaft 22 and is adjustably secured in place thereon by a set screw 75 engaging a recessed portion 76 of the shaft. The fan hub 74 acts as a thrust stop for the upper thrust bearing and limits the downward movement of the rotor and its shaft.

A phasing reactor in the form of a choke is also carried by the upper side of the base member 12. It includes two sets of laminations, E laminations 78 and I laminations 80. The E laminations are secured together by rivets 79 and the I laminations by rivets 81. The E and I laminations are separated by a fiber plate 83 to form a fixed gap therebetween and to provide a more nearly constant current characteristic for line voltage variations. The center leg of the E laminations carries a coil 84 wound on a suitable coil form 85, 86 formed of insulating material. The coil form carries connecting terminals 87. The coil form is securely held in place on the center leg of the E laminations by a wooden wedge 82. The laminations are encased in a sheet metal housing 88 suitably secured to the upper side of the base member 12. The forward edges of the housing 88 are provided with cam surfaces 89 which receive a wedge member 90. When the wedge member 90 is forced into place, the E and I laminations are securely clamped together and eliminate the humming or buzzing in the choke. If humming or buzzing of the choke should appear after the machine is in operation, this may be eliminated by merely further tightening the wedge. By applying a small amount of air-dry electrical varnish to the junction of the E and I laminations, the necessity for additional clamping means for the end laminations to prevent noise is eliminated. It is here noted that the phasing reactor is located at the rear portion of the machine so as to make the rear portion of the machine slightly heavier than the forward portion.

The electric motor including the stator 20, rotor 21, and rotor shaft 22 is illustrated in more detail in Figs. 2 to 14. The motor is of a continuous split phase inductor motor type and it is illustrated in this application as a two-pole motor having a pair of main windings and a pair of auxiliary windings. The motor stator 20 includes three sets of laminations, a main set 115 and a pair of crescent-shaped sub-sets 116. The stator lamination has a central opening 117 for receiving the rotor 21. It is externally provided with a pair of recesses 118 for receiving the sublaminations 116. The main lamination set includes a plurality of external slots 119—126, the slots 119—122 being arranged opposite to the slots 123—126. The portions of the laminations forming the external slots are held together by a thin wall laminated section 128. This thin wall laminated section 128 also operates more effectively to distribute the flux and enhance the performance of the motor. The main laminations are secured together by rivets 127. The sublaminations 116 have projections 130 engaging the main laminations and the sublaminations are secured together by rivets 131. The sublaminations operate to complete the magnetic path of the stator. The external slots 119—126 are provided with suitable slot liners 133 made of insulating material.

Because of the external slot arrangement, the motor coils may be machine wound on the stator laminations 115. The manner of so winding the coils is illustrated in Figs. 5 and 6. The stator lamination 115 is placed in a suitable winding fixture to be rotated about the axis XY, which axis is perpendicular to planes passing through the slots 119, 125 and the slots 120, 126. Wire is fed into these slots as the stator lamination 115 is rotated and in this way coils 135 and 136 are machine wound directly on the stator. The coils 135 and 136 form the main windings of the motor. When winding of these coils is completed, then the stator lamination 115 is rotated to a new position illustrated in Fig. 6, wherein planes passing through slots 121, 123 and 122, 124 are perpendicular to the axis XY of rotation. Coils 137 and 138 are, therefore, wound in the slots 121, 123 and 122, 124. The coils 137 and 138 are the auxiliary coils of the motor. In winding the motor, the same size wire is preferably used for all the coils and also each coil preferably has substantially the same number of turns. The portions of the coils lying exterior of the slots are preferably tied as at 140 and are bent over laterally to clear the rotor 21. The ends of the wire forming the coils may be covered with suitable spaghetti 139 and connected to the terminals 87 on the phasing reactor, the phasing reactor thus acting as a terminal board for the electrical connections. As a result of winding the coils on the stator in this manner, the necessity for separate lead wires is eliminated. The physical arrangement of the tied coils is illustrated in Figs. 8 and 9. The locations of these coils is diagrammatically illustrated in Fig. 10. The wiring of the motor and the reactor is schematically illustrated in Fig. 7. Here it is seen that the main windings 135 and 136 are connected in parallel to each other and to the terminals 87a and 87b. The auxiliary windings 137 and 138 are connected in series with each other and to the terminals 87b and 87c. The phasing reactor 84 is connected across the terminals 87b and 87c and in parallel with the auxiliary windings. The terminals 87a and 87c are connected to a voltage source L—L which may be the conventional voltage supply of 105 to 120 volts, 60 cycles, A. C. The motor under normal polishing and scrubbing conditions operates at approximately 3300 R. P. M. with a torque of substantially 2 inch pounds. The motor also is capable of starting at voltages less than 100 volts even under polishing load conditions.

The motor rotor 21 includes laminations 142 carried on a sleeve 143, the sleeve being pressed onto the motor shaft 22 and held for rotation therewith by projections 144 formed on the shaft. The projections operate to key the rotor to the shaft. The rotor also includes integral annular rings 145, rotor bars and cooling fins 146 preferably formed of die cast aluminum. The rotor laminations 142 and stator laminations 115 and 116 are preferably all punched simultaneously from silicon steel in strip form. This eliminates waste of material and assures accuracy of the parts.

From the above description, it is seen that the present invention has provided a novel motor which is of simple construction and may be readily and inexpensively manufactured. In addition, it will be seen that the novel motor of this invention provides improved operating characteristics adapted for general use, and particularly adapted for use in floor polishing and scrubbing machines of the type described.

While for purpose of illustration one form of this invention has been disclosed, other forms thereof may become apparent to those skilled in the art upon reference to this disclosure and, therefore, this invention is to be limited only by the scope of the appended claims.

I claim as my invention:

1. A cylindrical laminated motor stator comprising, a laminated main stator member having a central cylindrical opening for receiving a motor rotor, a substantially cylindrical exterior provided with a pair of opposed arcuate recesses and a plurality of opposed winding slots opening into the recesses and closed from the central cylindrical opening by a thin wall for receiving motor windings, and a pair of laminated sub-stator members of arcuate configuration received in the arcuate recesses of the main stator member for completing the magnetic circuit of the stator.

2. A cylindrical laminated motor stator comprising, a laminated main stator member having a central cylindrical opening for receiving a motor rotor, a substantially cylindrical exterior provided with a pair of opposed arcuate recesses and a plurality of opposed winding slots opening into the recesses and closed from the central cylindrical opening by a thin wall for receiving motor windings, a pair of laminated sub-stator members of arcuate configuration received in the arcuate recesses of the main stator member for completing the magnetic circuit of the stator, and a band for clamping together the stator members.

3. A cylindrical laminated motor stator comprising, a laminated main stator member having a central cylindrical opening for receiving a motor rotor, a substantially cylindrical exterior provided with a pair of opposed arcuate recesses and a plurality of opposed winding slots opening into the recesses and closed from the central cylindrical opening by a thin wall for receiving motor windings, a slot liner in each winding slot comprising a scored fibre member folded to enclose the motor winding therein, a pair of laminated sub-stator members of arcuate configuration received in the arcuate recesses of the main stator member for completing the magnetic circuit of the stator and for holding closed the slot liners.

4. A cylindrical laminated motor stator comprising, a laminated main stator member having a central cylindrical opening for receiving a motor rotor, a substantially cylindrical exterior provided with a pair of opposed arcuate recesses and a plurality of opposed winding slots opening into the recesses and closed from the central cylindrical opening by a thin wall for receiving motor windings, a slot liner in each winding slot comprising a scored fibre member folded to enclose the motor winding therein, a pair of laminated sub-stator members of arcuate configuration received in the arcuate recesses of the main stator member for completing the magnetic circuit of the stator and for holding closed the slot liners, and a band for clamping together the stator members.

5. An electric motor comprising, a laminated main stator member having a central cylindrical opening, a pair of opposed arcuate recesses and a plurality of opposed winding slots closed from the central cylindrical opening by a thin wall and opening into said recesses, a plurality of stator windings, each wound externally into a pair of opposed winding slots, laminated sub-stator members fitting within said recesses for enclosing the outer ends of the winding slots to complete the magnetic circuit of the stator, and a rotor received in the central cylindrical opening of the stator.

6. An electric motor comprising, a laminated main stator member having a central cylindrical opening, a substantially cylindrical exterior provided with a pair of opposed arcuate recesses and a plurality of opposed winding slots opening into the recesses and closed from the central cylindrical opening by a thin wall, a plurality of stator windings, each wound externally into a pair of opposed winding slots, a pair of laminated sub-stator members of arcuate configuration received in the arcuate recesses of the main stator member for completing the magnetic circuit of the stator, and a rotor received in the central cylindrical opening of the stator.

7. A two pole single phase induction motor comprising, a laminated main stator member having a central cylindrical opening and four pairs of opposed and outwardly opening winding slots closed from the central cylindrical opening by a thin wall, all of said slots being disposed substantially within opposed quadrants of said main stator member, a pair of main stator windings, each wound externally and in planes parallel to each other into a pair of opposed winding slots, a pair of auxiliary stator windings, each wound externally and in planes parallel to each other into a pair of opposed winding slots, the planes of the auxiliary windings being at an angle with respect to the planes of the main windings, laminated sub-stator members for enclosing the outer ends of the winding slots to complete the magnetic circuit of the stator, and a rotor received in the central opening of the stator.

8. A two pole single phase induction motor comprising, a laminated main stator member having a central cylindrical opening and four pairs of opposed and outwardly opening winding slots closed from the central cylindrical opening by a thin wall, all of said slots being disposed substantially within opposed quadrants of said main stator member, a pair of main stator windings, each wound externally and in planes parallel to each other into a pair of opposed winding slots, a pair of auxiliary stator windings, each wound externally and in planes parallel to each other into a pair of opposed winding slots, the planes of the auxiliary windings being at an angle with respect to the planes of the main windings, a slot liner in each winding slot comprising a scored fibre member folded to enclose the motor winding therein, laminated sub-stator members for enclosing the outer ends of the winding slots to complete the magnetic circuit of the stator, and a rotor received in the central opening of the stator.

9. A two pole single phase induction motor comprising, a laminated main stator member having a central cylindrical opening and four pairs of opposed and outwardly opening winding slots closed from the central cylindrical opening by a thin wall, all of said slots being disposed substantially within opposed quadrants of said main stator member, a pair of main stator windings, each wound externally and in planes parallel to each other into a pair of opposed winding slots, a pair of auxiliary stator windings, each wound externally and in planes parallel to each other into a pair of opposed winding slots, the planes of the auxiliary windings being at an angle with respect to the planes of the main windings, laminated sub-stator members for enclosing the outer ends of the winding slots to complete the magnetic circuit of the stator, and a rotor received in the central opening of the stator, all of said stator windings being wound from substantially the same size wire and with substantially the same number of turns.

10. A two pole single phase induction motor comprising, a laminated main stator member having a central cylindrical opening and four pairs of opposed and outwardly opening winding slots closed from the central cylindrical opening by a thin wall, all of said slots being disposed substantially within opposed quadrants of said main stator member, a piar of main stator windings, each wound externally and in planes parallel to each other into a pair of opposed winding slots, a pair of auxiliary stator windings, each wound externally and in planes parallel to each other into a pair of opposed winding slots, the planes of the auxiliary widnings being at an angle with respect to the planes of the main windings, laminated sub-stator members for enclosing the outer ends of the winding slots to complete the magnetic circuit of the stator, a rotor received in the central opening of the stator, a phasing reactor separate from the motor, means for connecting the main windings in parallel with each other, the auxiliary windings in series with each other and the parallel connected main windings and the series connected auxiliary windings in series across an A. C. voltage source, and means for connecting the phasing reactor in parallel with the series connected auxiliary windings.

11. A two pole single phase induction motor comprising, a laminated main stator member having a central cylindrical opening and four pairs of opposed and outwardly opening winding slots closed from the central cylindrical opening by a thin wall, a pair of main stator windings, each wound externally and in planes parallel to each other into a pair of opposed winding slots, a pair of auxiliary stator windings, each wound externally and in planes parallel to each other into a pair of opposed winding slots, the planes of the auxiliary windings being at an angle with respect to the planes of the main windings, laminated sub-stator member for enclosing the outer ends of the winding slots to complete the magnetic circuit of the stator, a rotor received in the central opening of the stator, all of said stator windings being wound from substantially the same size wire and with substantially the same number of turns, a phasing reactor separate from the motor, means for connecting the main windings in parallel with each other, the auxiliary windings in series with each other and the parallel connected main windings and the series connected auxiliary windings in series across an A. C. voltage source, and means for connecting the phasing reactor in parallel with the series connected auxiliary windings.

12. In a two pole single phase induction motor comprising four substantially identical stator windings including two main windings and two auxiliary windings and a phasing reactor, means for connecting the main windings in parallel with each other, the auxiliary windings in series with each other and the parallel connected main windings and the series connected auxiliary windings in series across an A. C. voltage source, and means for connecting the phasing reactor in parallel with the series connected auxiliary windings.

13. An electric motor comprising a laminated stator member having a central cylindrical opening and four pairs of opposed and outwardly opening winding slots separated from said central opening by a wall, all of said slots being disposed substantially within opposed quadrants of the stator member, a pair of main stator windings, each wound externally and in planes substantially parallel to each other into a pair of opposed winding slots, and a pair of auxiliary stator windings, each wound externally and in planes substantially parallel to each other into a pair of opposed winding slots, and a rotor disposed within the central opening of the stator member.

14. In an electrical motor a stator member having a central opening and a plurality of winding slots therein, a pair of main stator windings, each wound into certain of said winding slots, a pair of auxiliary stator windings, each wound into other of said winding slots, a rotor disposed within the central opening of the stator member, a phasing reactor, means for connecting the main windings in parallel with each other, the auxiliary windings in series with each other and the parallel connected main windings and the series connected auxiliary windings in series across an A. C. voltage source, and means for connecting the phasing reactor in parallel with the series connected auxiliary windings.

References Cited in the file of this patent

UNITED STATES PATENTS

| | | |
|---|---|---|
| 620,965 | Rice et al. | Mar. 14, 1899 |
| 848,925 | Schattner | Apr. 2, 1907 |
| 1,257,178 | Bergman | Feb. 19, 1918 |
| 1,431,947 | Gysel | Oct. 17, 1922 |
| 1,538,196 | Livingston | May 19, 1925 |
| 2,303,291 | Moss | Nov. 24, 1942 |
| 2,416,735 | Brennen | Mar. 4, 1947 |
| 2,417,746 | Fletcher | Mar. 8, 1947 |
| 2,423,345 | Roters | July 1, 1947 |
| 2,458,436 | Smith | Jan. 4, 1949 |
| 2,606,311 | Burian | Aug. 5, 1952 |

FOREIGN PATENTS

| | | |
|---|---|---|
| 628,377 | Great Britain | Aug. 26, 1949 |